(12) United States Patent
Searfoss et al.

(10) Patent No.: US 7,866,725 B1
(45) Date of Patent: Jan. 11, 2011

(54) CABLE ROLL TARP SYSTEM FOR REAR OPENING TRAILER

(75) Inventors: Timothy Searfoss, West Branch, MI (US); John Orr, West Branch, MI (US)

(73) Assignee: Roll-Rite, LLC, Alger, MI (US)

( * ) Notice: Subject to any disclaimer, the term of this patent is extended or adjusted under 35 U.S.C. 154(b) by 0 days.

(21) Appl. No.: 12/698,421

(22) Filed: Feb. 2, 2010

(51) Int. Cl.
*B60J 7/00* (2006.01)
(52) U.S. Cl. .................................. 296/98; 296/100.14
(58) Field of Classification Search ................. 296/98, 296/100.14, 100.13
See application file for complete search history.

(56) References Cited

U.S. PATENT DOCUMENTS

| | | | |
|---|---|---|---|
| 5,002,328 A * | 3/1991 | Michel | .......................... 296/98 |
| 5,031,955 A | 7/1991 | Searfoss | |
| 5,829,819 A | 11/1998 | Searfoss | |
| 5,887,937 A | 3/1999 | Searfoss | |
| 5,944,374 A | 8/1999 | Searfoss | |
| 6,199,935 B1 * | 3/2001 | Waltz et al. | .................... 296/98 |
| 6,206,449 B1 | 3/2001 | Searfoss | |
| 6,715,817 B2 | 4/2004 | Nolan et al. | |
| 6,783,168 B2 | 8/2004 | Searfoss | |
| 7,188,887 B1 | 3/2007 | Schmeichel | |
| 7,195,304 B1 | 3/2007 | Schmeichel | |

* cited by examiner

*Primary Examiner*—Joseph D Pape
(74) *Attorney, Agent, or Firm*—Miller, Canfield, Paddock and Stone; Timothy Engling

(57) ABSTRACT

A roll tarp system with a rear assembly including a pivoting arm and cable to help deploy the roll tarp system. The pivoting arm and flexible cable can articulate to allow a rear door to open. The roll tarp system includes a conventional roll tarp on a roller attached to one side of a container of a truck or trailer and an actuator to operate the tarp. A pivoting arm can be attached to the outside of a rear opening door on the container. A flexible cable has one end attached to the distal end of the pivoting arm and another end attached to the tarp axle of the roller of the roll tarp. Preferably, the flexible cable consists of the only structure between a cable attachment at the pivoting arm and an attachment at the axle of the roller.

6 Claims, 6 Drawing Sheets

CABLE ROLL TARP SYSTEM FOR REAR OPENING TRAILER

FIELD OF THE DISCLOSURE

This disclosure relates to roll tarp systems for vehicles and trailers including containers with rear opening doors. More specifically, the disclosure relates to a rear assembly including a pivoting arm and cable to help deploy the roll tarp system.

BACKGROUND

Trucks and cabs pulling trailers can have open top trailers or truck containers, for which the contents may want to be protected from the environment or local regulations may require to be covered while transporting such contents of the container. For back dumping, certain trucks and trailers may have rear doors that open to allow contents to be dumped.

Roll tarps are well known for covering contents of the trucks and trailers during transportation. Roll tarps often include a tarp attached on an axle or roller to a side of a container. Roll-Rite produces a side-to-side knuckle arm assembly to unroll or open and to roll to close the tarp to cover the contents of the container.

Early roll tarps would have to be removed from trucks or trailer with rear opening doors when opening the doors. Roll tarp systems were developed to be used on trucks and trailers with rear doors without having to disconnect the system from the container or its door.

U.S. Pat. No. 7,195,304 discloses roll tarp system for use on vehicles and trailers with rear doors or gates. The roll tarp system includes a tarp attached to a side of a container, a roller attached to the tarp opposite of the container, a rear inner arm pivotally attached to the container, a first bias member attached to the rear inner arm, a rear outer arm attached to the first bias member, a second bias member attached to the rear outer arm and rotatably connected to a rear end of the roller and a front support structure rotatably connected to a front end of the roller.

The applicant considered intermediate rigid portions on a cable in conjunction with a cable deployed tarp system, but that is not considered prior art to the present disclosure, which does not include an intermediate rigid portion. An intermediate rigid portion between a rear pivoting arm and the roller of the roll tarp can be disposed between two flexible cables. An intermediate rigid portion could also form a sleeve on a cable as disclosed herein.

Existing tarp systems employ complicated structures with multiple arms and biasing members.

SUMMARY

The present disclosure provides a roll tarp system with rear assembly including a pivoting arm and cable to help deploy the roll tarp system. This system used on a rear door is well suited for use on trucks and trailers having rear doors that open to allow contents of the container to be dumped. The pivoting arm and cable articulate to allow the rear door to open.

The roll tarp system includes a conventional roll tarp on a roller attached to one side of a container of a truck or trailer and an actuator, preferably a side-to-side knuckle arm assembly, to operate the tarp. A pivoting arm is attached to the outside of a rear opening door, which can open either on a side or a top axis on the container. A flexible cable has one end attached to the distal end of the pivoting arm and another end attached to the tarp axle of the roller of the roll tarp.

The pivoting arm and cable are easy and cost-effective to make, install and use. The roll tarp system can be use with a container with a rear door for dumping its contents, including where the rear door opens at a pivot point set back from a back edge of the container, wherein the flexible cable can remain attached to the roller of the roll tarp and does not interfere with opening of the rear door.

BRIEF DESCRIPTION OF THE DRAWINGS

The above-mentioned and other features of this disclosure and the manner of obtaining them will become more apparent, and the disclosure itself will be best understood by reference to the following descriptions of systems taken in conjunction with the accompanying figures, which are given as non-limiting examples only, in which.

The exemplifications set out herein illustrate embodiments of the disclosure that are not to be construed as limiting the scope of the disclosure in any manner. Additional features of the present disclosure will become apparent to those skilled in the art upon consideration of the following detailed description of illustrative embodiments exemplifying the best mode of carrying out the disclosure as presently perceived.

DETAILED DESCRIPTION

While the present disclosure may be susceptible to embodiments in different forms, the figures show, and herein described in detail, embodiments with the understanding that the present descriptions are to be considered exemplifications of the principles of the disclosure and are not intended to be exhaustive or to limit the disclosure to the details of construction and the arrangements of components set forth in the following description or illustrated in the figures.

Figure 1:
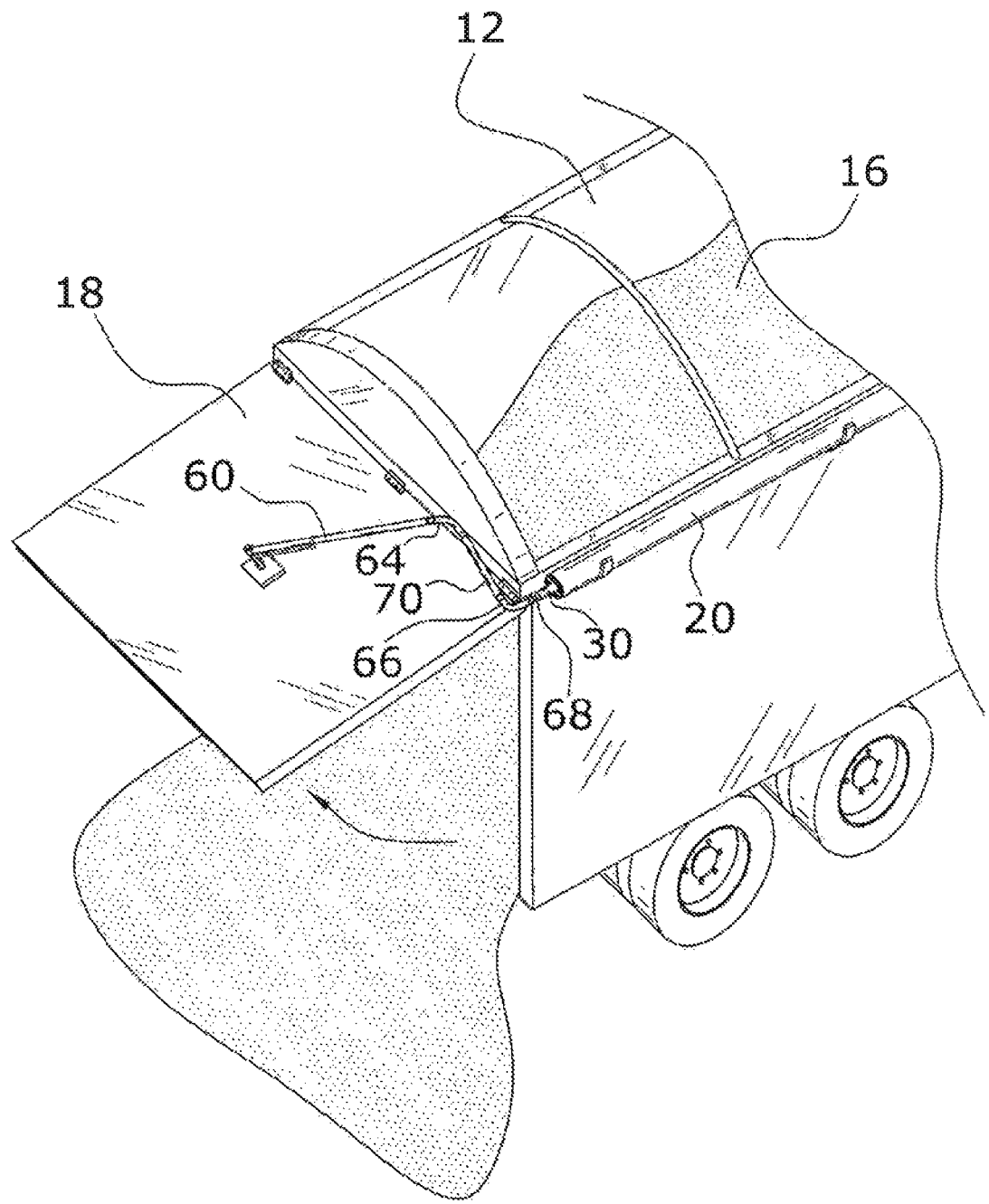
FIG. 1 shows a prior art roll tarp system.

FIG. 1 shows a prior art roll tarp system 10 of U.S. Pat. No. 7,188,887. Consistent with the present disclosure, the rear pivotally attached arm 60 (inner) and 64 (outer) (hereinafter pivoting arm 60 for this disclosure) and the tarp 20 attached to a side of a container 12, a roller 30 attached to the tarp 20 opposite of the container 12 can be the same in the present disclosure and are known in the art. The tarp axle 68 rotatably engages the elongated roller 30. The present disclosure eliminates the rear outer arm 70 and the second bias member 66 positioned between the rear outer arm 64 and the roller 30. The front support structure is also different.

Figure 2:
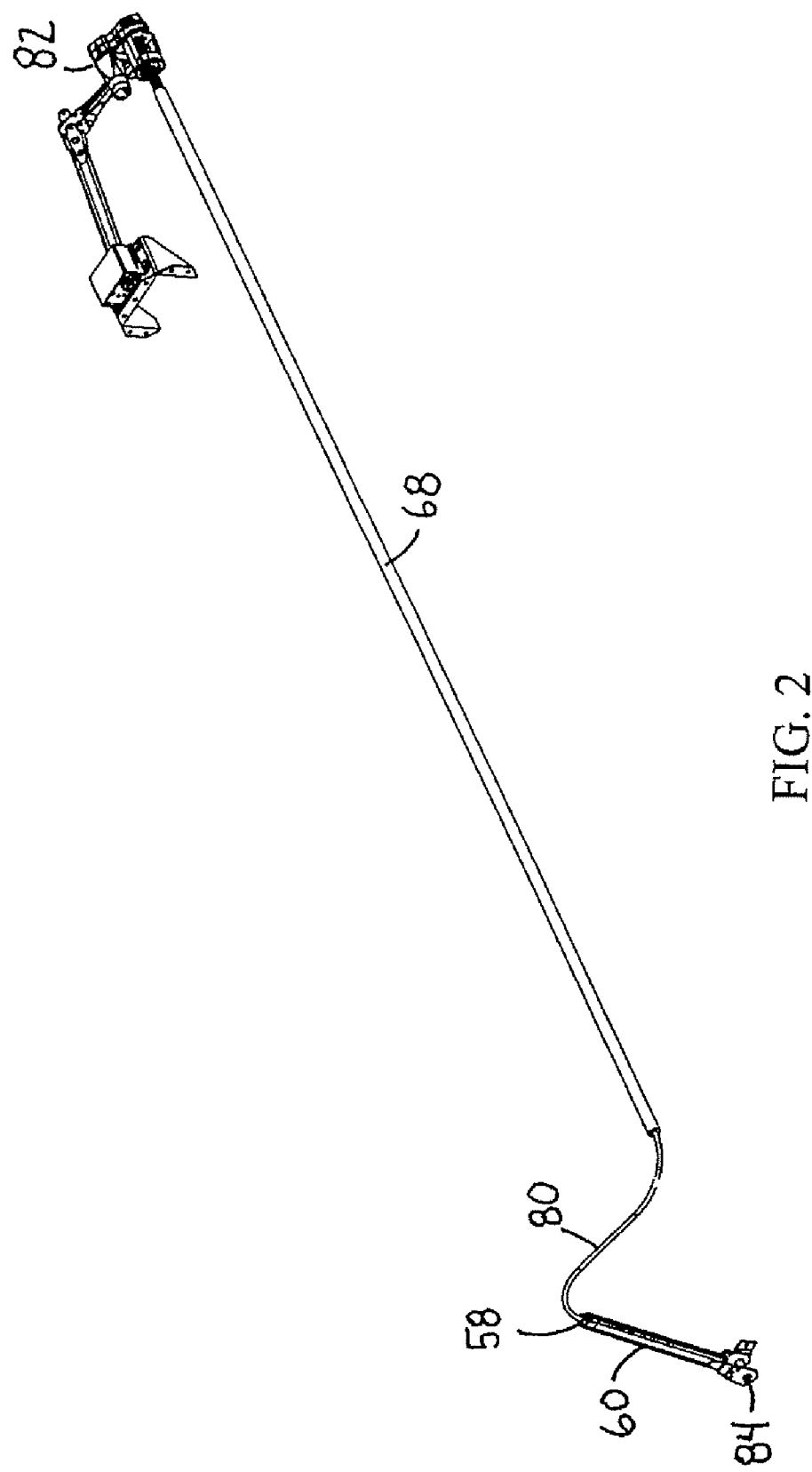
FIG. 2 shows a rear assembly including a cable attached to a tarp axle with the side-to side knuckle arm assembly.

FIG. 2 shows rear assembly 58 of the present disclosure including pivoting arm 60 and cable 80 to help deploy a roll tarp system 10. The cable 80 is also attached to a tarp axle 68. A side-to-side knuckle arm assembly 82 can be on the opposite (front) side of the tarp axle 68 as a means to actuate the roll tarp 20. The assembly 82 causes the tarp 20 to be wound upon the roller 30 that causes the roller 30 to move in an opening direction or in reverse to unwind to close the tarp 20. The roller 30 can be otherwise actuated to cover and uncover the container 12 and the contents or load 16 of the container 12, such as by a motor and hand crank. Such opening of the tarp structure is known in the art. For clarity, only the tarp axle 68 is shown as would be used relative to a container 12.

Figure 3:
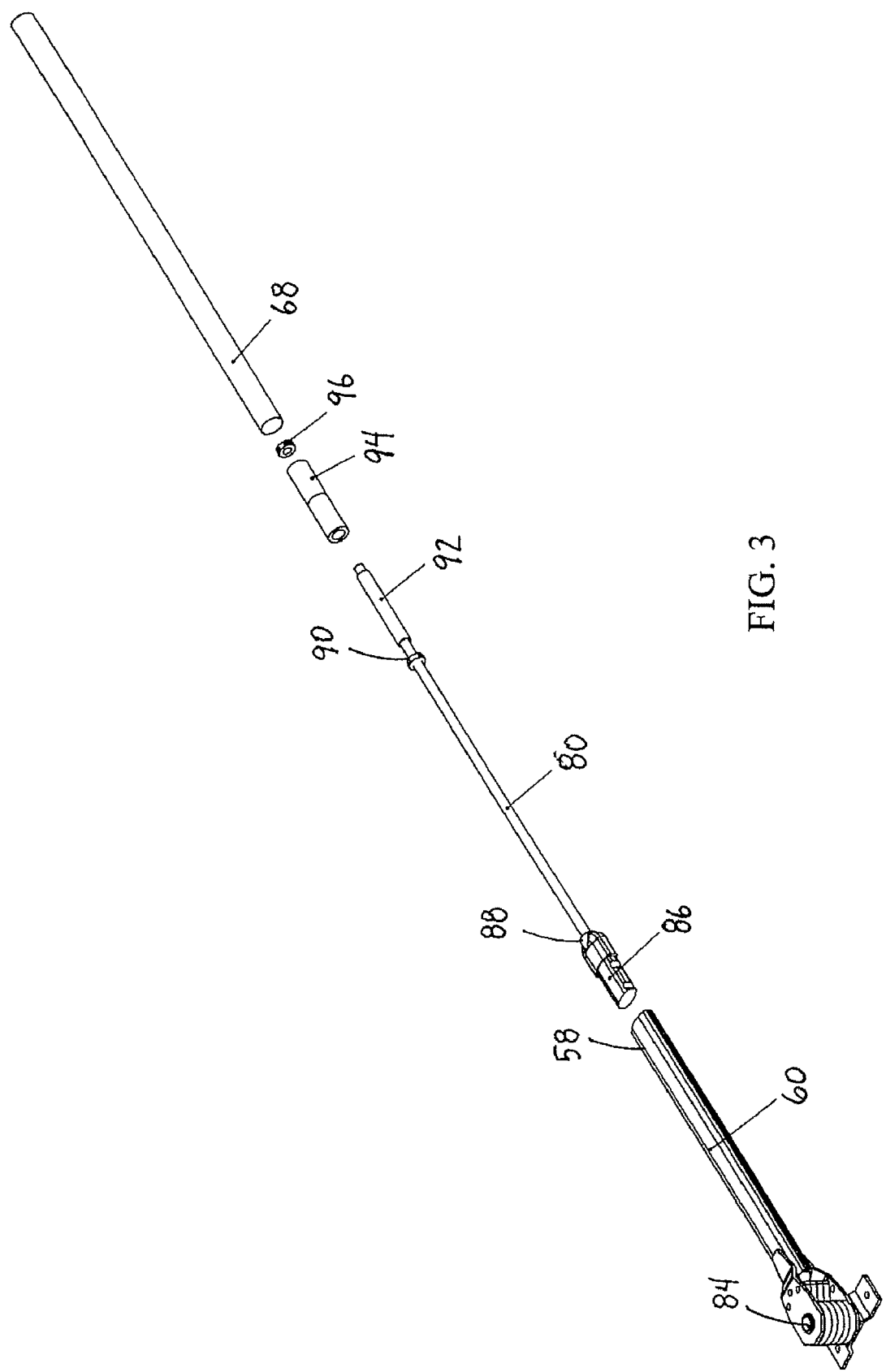
FIG. 3 shows an expanded view of the rear assembly.

FIG. 3 shows an expanded view of the rear assembly 58 as attachable to the tarp axle 68. A pivoting arm 60 is the type that can be fixedly attached to a rear door 18, but pivots relative the rear door 18 at a pivot point 84. The pivot arm 60 is readily mounted on the external surface of the rear door 18 so the contents 16 of the container do not hinder it from pivoting. A cable attachment 86 connects the cable 80 to the pivoting arm 60. The first end 88 of the cable 80 may be otherwise secured or fastened to the distal end of the pivoting arm 60 by a variety of mechanical means or fasteners.

A second end 90 of the cable 80 connects to the tarp axle 68 of a roller 30. The tarp axle 68 and roller 30 are known in the art. Any suitable mount would be appropriate, but a bushing arrangement is preferred. The second end 90 of the cable 80 can be connected to a bushing liner 92 that cooperates with a bushing 94 attached the tarp axle 68 of the roller 30 for a roll tarp 20. As shown in FIG. 3, one or more locking collars 96 can be used to help secure parts together. The cable 80 can stay connected to the roller 30 and adjust relative to the roller 30 as it rotates.

The flexible cable 80 preferably is the only structure between a cable attachment 86 at the pivoting arm 60 and the bushing liner 92 and bushing 94 combination. The simple structure works with the side-to-side knuckle arm assembly 82.

The cable 80 is flexible and can be galvanized, stainless steel or a variety of natural or manmade materials that are durable enough. The flexible cable 80 preferably has no bias, and it can drag along the container 12.

The rear door 18 can be opened or closed without removing or disconnecting the cable 80. The cable 80 does not interfere with the roller 30 or otherwise obstruct the rear door 18 when opened.

Figure 4:
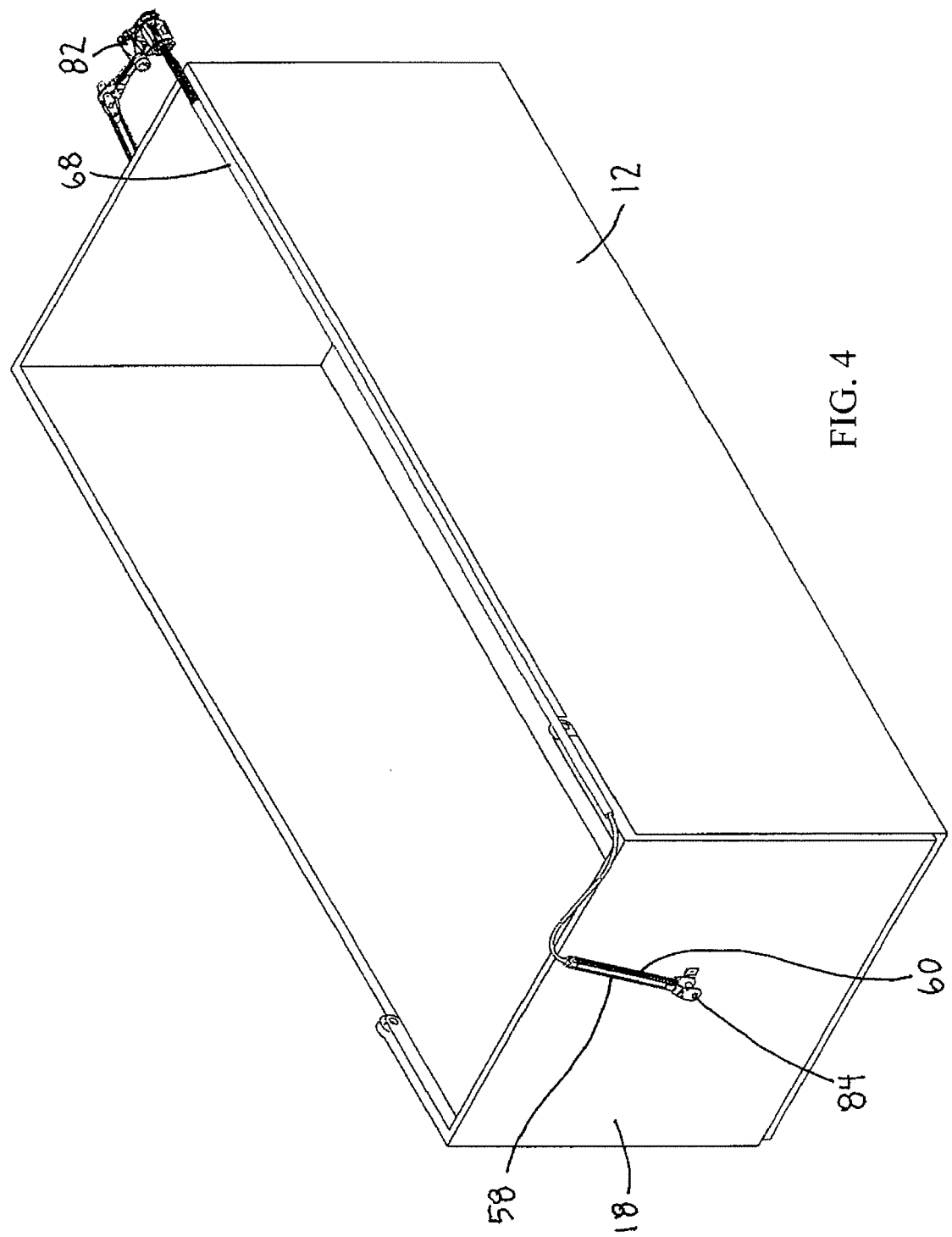
FIG. 4 shows a view of the rear assembly relative to the container wherein the tarp would be in the open position.

FIG. 4 shows a view of the rear assembly 58 relative to the container 12 wherein a tarp 20 would be in the open position. As shown in FIG. 4, the pivoting arm 60 is connected to the container 12 at the rear door 18 that opens back. For clarity, only the tarp axle 68 is shown as would be on the near side in the open position. The pivoting arm 60 is substantially upright in the open position.

Figure 5:
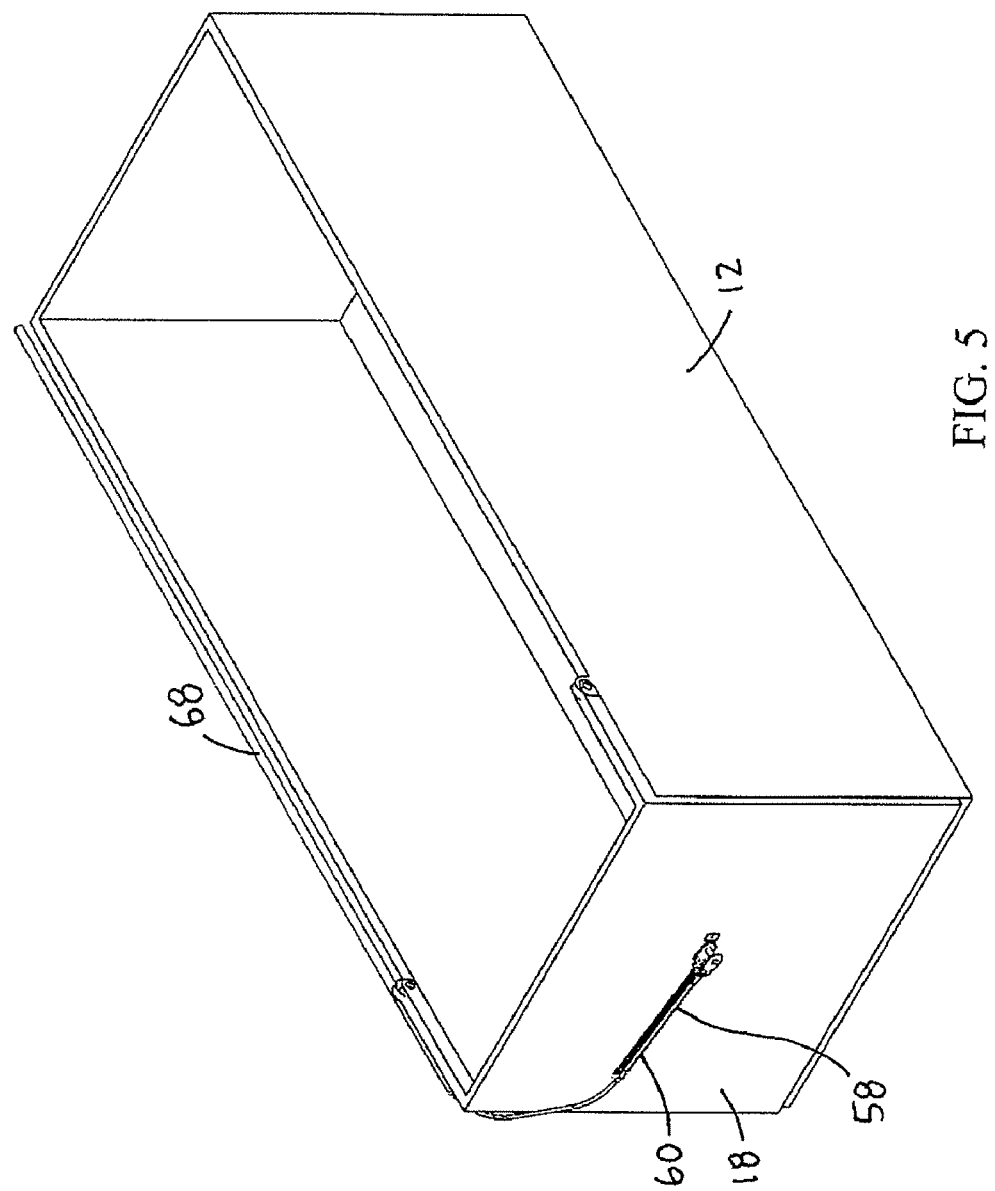
FIG. 5 shows a view of the rear assembly relative to the container wherein the tarp would be in the closed position.
Figure 6:
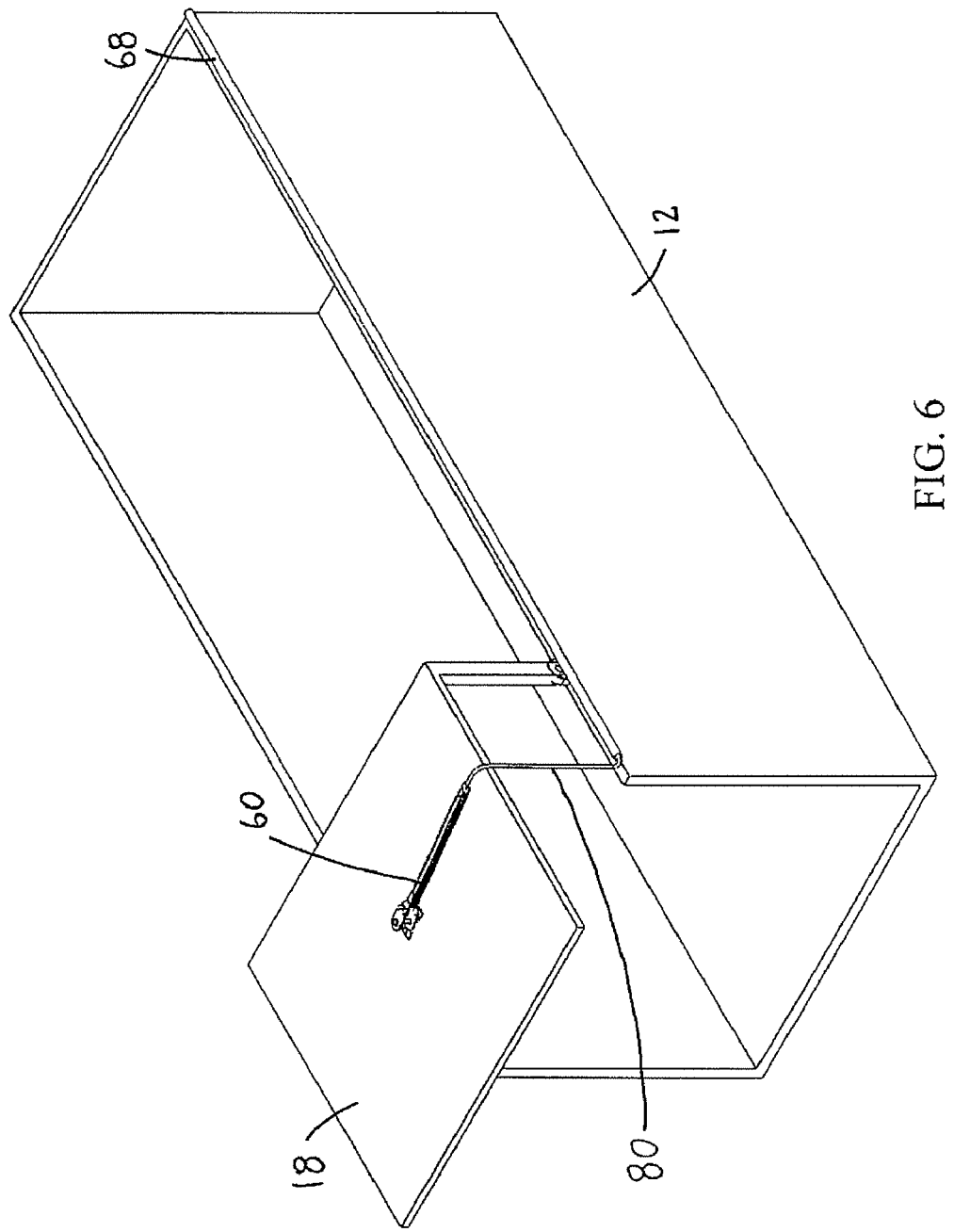
FIG. 6 shows a view in the open position as if dumping the contents of the container.

FIG. 5 shows rear assembly 58 relative to the container 12 wherein the tarp 20 would be in the closed position. The tarp axle 68 is shown as would be on the far side in the closed position. The pivoting arm 60 is substantially pivoted left and somewhat horizontal in the closed position. FIG. 6 shows the open position as if dumping the contents or load 16 of the container 12 wherein the cable 80 can remain attached to the axle 68 of the roller 30 of the roll tarp 20 and does not interfere with opening of the rear door 18 or dumping of the contents of the container 12.

FIG. 5 also shows a rear door 18 that opens at a pivot point set back from a back edge of the container 12. But the pivoting arm 60 and flexible cable 80 can articulate to open a variety of rear doors, including as standard top hinge gates, high lift gates, single barn door gates and double barn door gates. The pivoting arm 60 and flexible cable 80 can articulate in any direction necessary to allow a rear door to open.

This disclosure has been described as having exemplary embodiments and is intended to cover any variations, uses, or adaptations using its general principles. It is envisioned that those skilled in the art may devise various modifications and equivalents without departing from the spirit and scope of the disclosure as recited in the following claims. Further, this disclosure is intended to cover such variations from the present disclosure as come within the known or customary practice within the art to which it pertains.

What is claimed is:

1. Intended for use with a truck or trailer having a container with a rear door for dumping contents of the container, a roll tarp system attached to the rear door comprising:
    a roll tarp on a roller attached to a side of the container adapted to cover the contents of the container,
    a pivoting arm attached to the rear door; and
    a flexible cable with a first end connected to a distal end of the pivoting arm and a second end attached to the roller, wherein the flexible cable can remain attached to the roller and does not interfere with opening of the rear door.

2. The roll tarp system of claim 1 wherein the second end is connected to a bushing liner that cooperates with a bushing attached to an axle of the roller for the roll tarp.

3. The roll tarp system of claim 2 wherein the flexible cable consists of the only structure between a cable attachment at the pivoting arm and the bushing liner and bushing combination.

4. The roll tarp system of claim 1 wherein the rear door opens at a pivot point set back from a back edge of the container, and the pivoting arm and flexible cable articulate to allow the rear door to open.

5. A roll tarp system attached to a rear opening door of a container comprising:
    a roll tarp on an axle for a roller attached to a side of the container adapted to cover contents of the container,
    a pivoting arm attached to the rear opening door;
    a flexible cable with a first end connected to a distal end of the pivoting arm and a second end attached to the axle of the roller, wherein the flexible cable consists of the only structure between a cable attachment at the pivoting arm and an attachment at the axle of the roller.

6. The roll tarp system of claim 5 wherein the rear opening door opens at a pivot point set back from a back edge of the container wherein the flexible cable can remain attached to the axle of the roller of the roll tarp and does not interfere with rear opening of the door.

* * * * *